June 21, 1932.　　C. P. McCORMICK　　1,864,505
SPRAYING APPARATUS
Filed Oct. 6, 1930
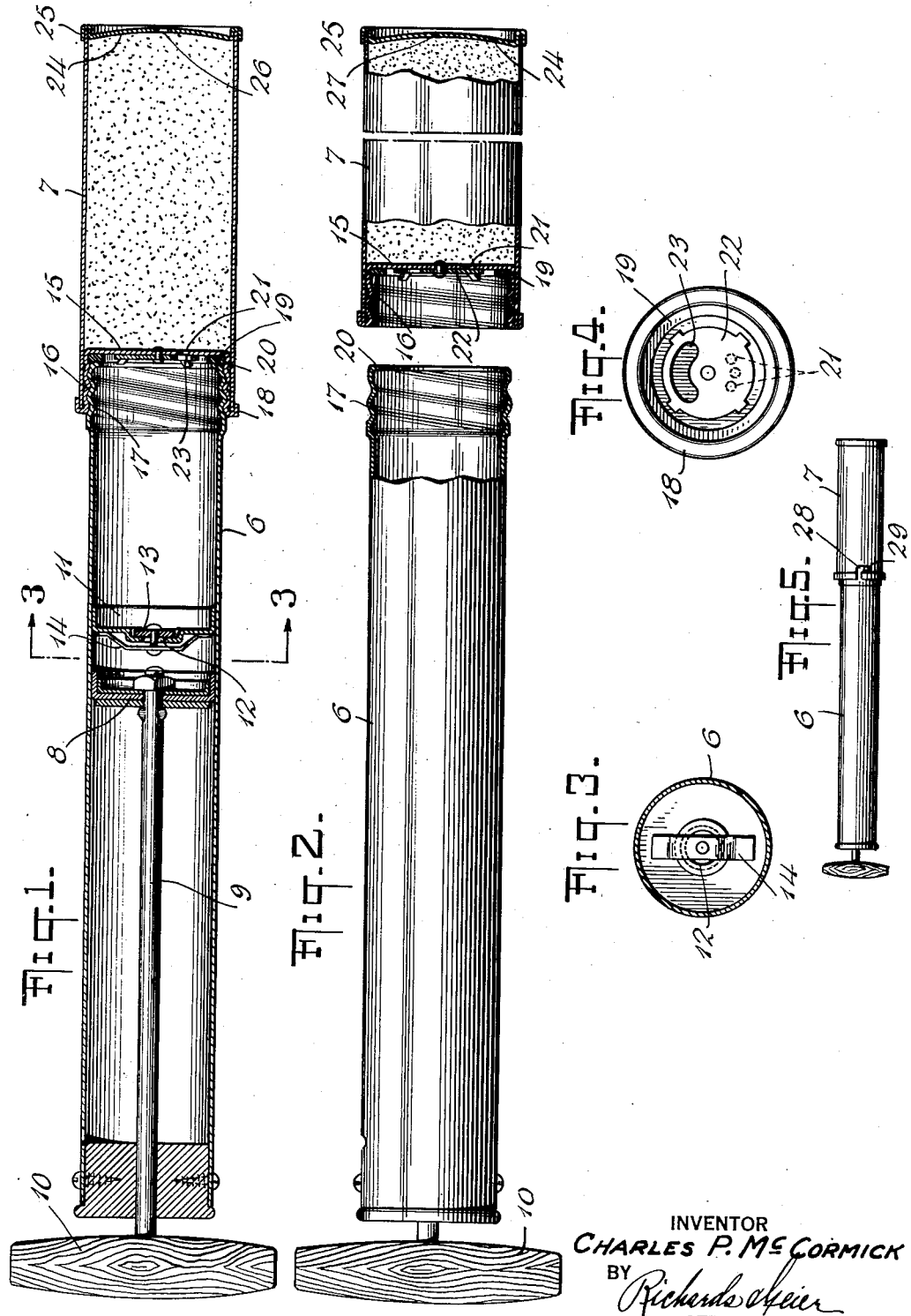
INVENTOR
CHARLES P. McCORMICK
BY
ATTORNEYS Patented June 21, 1932

1,864,505

UNITED STATES PATENT OFFICE

CHARLES P. McCORMICK, OF BALTIMORE, MARYLAND

SPRAYING APPARATUS

Application filed October 6, 1930. Serial No. 486,773.

This invention relates to improvements in spraying apparatus, and has particular reference to a device for dispensing insecticides and the like.

An object of the invention is to provide an improved apparatus of simple, inexpensive and practical construction, wherein an air pump and a material container, in the nature of a cartridge, are capable of being assembled and the material dispensed or sprayed from said container by operating said pump.

Another object is to provide a material container which can be easily and quickly attached to an air pump and removed therefrom when empty so that it can be replaced by a filled container.

A further object is to so construct the container and attach it to the air pump as to make it unnecessary to insert any instrumentality into the interior of the container to agitate the contents thereof while spraying the same.

The above and other objects will appear more clearly from the following detailed description, when taken in connection with the accompanying drawing, which illustrates preferred embodiments of the inventive idea.

In the drawing—

Figure 1 is a longitudinal section showing the air pump and material container constituting the spraying apparatus in assembled position;

Figure 2 is a partial longitudinal section illustrating the container detached from the pump;

Figure 3 is a section on the line 3—3 of Figure 1;

Figure 4 is an end elevation of the material container; and

Figure 5 is a side elevation showing a slightly modified form of the invention.

Referring more particularly to the accompanying drawing, the numeral 6 indicates the cylindrical body of the air pump, which is adapted to support, in a manner to appear in the course of the description, a material container the cylindrical body of which is indicated by the numeral 7. In accordance with the present invention, the pump and container are constructed as separate units of the apparatus which may be sold as a complete outfit and in which the container may also be merchandised separately and used in conjunction with the pump or simply as an individual device from which the contents may be sprinkled by a shaking action.

The pump 6 is provided with a reciprocating piston 8 of any desired construction to which is attached a plunger 9 extending through the closed end of the body 6 and provided at its outer extremity with a handle 10 utilized to reciprocate said plunger. At a point adjacent the open end of the body 6 there is mounted therein, in any suitable manner, a partition 11 having an opening 12 therein normally closed by a valve 13 held in covering position relative to said opening by the bowed spring 14, the intermediate portion of which is connected to said valve and the ends of which rest upon the partition 11. The space between the partition 11 and the open end of the body 6 constitutes a compressed air chamber into which air is forced past the valve 13 by the inward movement of the plunger 9 when the piston 8 is being reciprocated, and this compressed air is utilized to agitate and discharge the material from the container 7 when the latter is attached to the pump.

The container 7, which is adapted to receive any desired substance such as an insecticide to be dispensed or sprayed, is provided at one end with a closure 15 which fits into the body of the container and is provided with an outwardly extending annular flange 16, said flange being screw threaded to receive the similarly formed open end 17 of the body 6 and having its outer extremity bent over the end of the body 7, as indicated at 18, to secure said closure in position. If desired, a flexible gasket 19 may be introduced into the closure member so as to be engaged by the inturned extremity 20 of the open end of the pump body 6 in order to prevent leakage of air. The central portion of the closure member 15 is provided with a series of small openings 21 which are closed, before attachment of the container to the air pump, by a disk 22 rotatably mounted upon the closure member. This disk is provided with a slot 23 which, when the disk is rotated to proper position before attachment to the air pump, will register with the openings 21 and thus establish communication between the pump and interior of the container 7 for the admission of air into the latter to agitate the material therein. If the container is used separate from the pump, the registering of the openings 21 and 23 as just described will permit the contents of the container to be sprinkled by a shaking action of the latter. The end of the container 7 opposite the closure member 15 is closed by the end member 24, the periphery of which is crimped over the body of the container, as indicated at 25, while the central portion is made arcuate. This central portion is recessed entirely within the outer edge of the end member so that the container may be placed in an upright position upon a support without said central portion touching the latter. When the container is used in conjunction with the air pump, a discharge opening 26 is formed in the end member 24 which is scored for this purpose, as indicated at 27 in Figure 2. By making the central portion of the end member 24 of arcuate formation the material in the container adjacent the discharge opening will be better agitated and have a whirling action imparted thereto by the air currents injected into the container by the operation of the pump so that said material will be sprayed through said opening in a steady stream.

The construction of the pump and container, as illustrated in Figure 5, is precisely the same as that described above with the exception that, instead of employing the screw threads 16 and 17 to connect said parts, the container is provided with a bayonet slot 28 adapted to receive a pin 29 on the end of the pump.

From the foregoing description, it will be apparent that the invention provides an apparatus in which the pump and container are so constructed that they may be easily and quickly connected in cooperative relationship and disassembled, and wherein the construction of the container is such that no additional instrumentalities in the nature of spouts or agitating means need be employed in order to spray the contents thereof.

What is claimed is:

1. The combination with an air pump having means at one end for attaching a container thereto; of a material container having an end closure provided with means cooperating with the first named means to support said container upon said pump, and also having another end closure provided with a material discharge opening.

2. A material container capable of attachment to a pump and having a closure at one end provided with means for engaging a portion of said pump; and a closure of arcuate formation for the other end of said container, said closure having a discharge opening formed therein and constituting a nozzle through which material is discharged from said container.

3. A material container capable of attachment to a pump and comprising a body, a closure for one end thereof recessed within said body and having a threaded flange engaging the wall of the latter, said closure having an opening therein, a valve mounted on said closure and controlling said opening, and a closure for the other end of said body capable of having a discharge opening formed therein.

4. A material container capable of attachment to a pump and comprising a body, a closure for one end thereof recessed within said body and having a threaded flange engaging the wall of the latter, said closure having an opening therein, a valve mounted on said closure and controlling said opening, and a closure of arcuate formation for the other end of said body capable of having a discharge opening formed therein.

In testimony whereof, I have affixed my signature.

CHARLES P. McCORMICK.